United States Patent [19]

Senn et al.

[11] Patent Number: 5,268,449

[45] Date of Patent: Dec. 7, 1993

[54] RANDOM COPOLYMERS OF POLY(ARYLENE SULFIDE)S AND PROCESS THEREFOR

[75] Inventors: Dwayne R. Senn; Rex L. Bobstein, both of Bartlesville, Okla.; Owen H. Decker, West Reading, Pa.; Carlton E. Ash, Sugarland, Tex.; Darryl R. Fahey; Jon F. Geibel, both of Bartlesville, Okla.

[73] Assignee: Phillips Petroleum Company, Bartlesville, Okla.

[21] Appl. No.: 976,857

[22] Filed: Nov. 16, 1992

[51] Int. Cl.$^5$ ............................................. C08G 75/14
[52] U.S. Cl. .................................... 528/388; 525/537
[58] Field of Search ......................... 528/388; 525/537

[56] References Cited

U.S. PATENT DOCUMENTS

| | | | |
|---|---|---|---|
| 4,301,274 | 11/1981 | Campbell | 528/388 |
| 4,490,522 | 12/1984 | Kawabata et al. | 528/388 |
| 4,774,276 | 9/1988 | Babsein et al. | 528/388 |
| 4,960,841 | 10/1990 | Kawabata et al. | 525/537 |
| 5,015,702 | 5/1991 | Scoggins et al. | 525/537 |

FOREIGN PATENT DOCUMENTS 266765 1/1988 European Pat. Off. .

Primary Examiner—John C. Bleutge
Assistant Examiner—Helen F. Lee
Attorney, Agent, or Firm—Lucas K. Shay

[57] ABSTRACT

A random copolymer composed of at least one arylene sulfide segment and at least one arylene aulfide sulfone segment is prepared by contacting at least one dihaloaromatic sulfide having a formula of $X-Ar(R)_n-S-Ar^1(R^1)_n-X^1$, with a mixture comprising at least one sulfur source and at least one dihaloaromatic sulfone having a formula of $X^2-Ar^2(R^2)_n-S(O_2)-Ar^3(R^3)_n-X^3$ in the presence of a polar organic compound under polymerization conditions to synthesize a random copolymer; where $X$, $X^1$, $X^2$, and $X^3$ can be the same or different halogens and are each selected from the group consisting of fluorine, chlorine, bromine and iodine; $Ar$, $Ar^1$, $Ar^2$, and $Ar^3$ are each an arylene group; $R$, $R^1$, $R^2$, and $R^3$ are each selected from the group consisting of hydrogen and hydrocarbyl radical in which the hydrocarbyl radical can be alkyl, cycloalkyl, alkenyl, and aryl radicals; and n is a whole number from 0 to 4. The total number of carbon atoms in each molecule represented by $X-Ar(R)_n-S-Ar^1(R^1)_n-X^1$ and $X^2-Ar^2(R^2)_n-S(O_2)-Ar^3(R^3)_n-X^3$ is in the range of from about 12 to about 54.

22 Claims, No Drawings

RANDOM COPOLYMERS OF POLY(ARYLENE SULFIDE)S AND PROCESS THEREFOR

FIELD OF THE INVENTION

The present invention relates to a composition of random copolymers of poly(arylene sulfide)s and a process for preparing the copolymers.

BACKGROUND OF THE INVENTION

Engineering plastics such as poly(arylene sulfide) resins are excellent polymers having good thermal stability, chemical resistance, flame resistance, and electrical insulation properties. These physical properties make them useful as coatings for pipes, tanks, or pumps, in manufacturing extruded articles, films, sheets, or fibers, and in electronic or electrical applications.

On the other hand, there are applications where the impact strength or toughness of poly(arylene sulfide) resins needs to be increased for further development in the above-described applications. Thus, there is a need to provide added toughness or impact strength to compositions derived from poly(arylene sulfide) polymers.

Aromatic sulfide/sulfone polymers, such as poly(arylene sulfide sulfone)s (PASS), are also known thermoplastic materials which exhibit high temperature resistance as well as chemical resistance. These aromatic sulfide/sulfone polymers can be made according to processes disclosed in a series of patents to Robert W. Campbell, for example, U.S. Pat. No. 4,016,145, which is incorporated herein by reference.

Blends of poly(arylene sulfide) resins with poly(arylene sulfide sulfone) resins have been proposed in an attempt to provide compositions exhibiting the desirable properties of both components. However, such blends have not generally been successful in the achievement of the desired improvement in properties for the PAS compositions such as toughness and reduced brittleness.

Block copolymers of poly(phenylene sulfide) and poly(phenylene sulfide sulfone) have been disclosed. However, attempts to prepare random copolymers of poly(arylene sulfide) and poly(arylene sulfide sulfone) from their respective monomers, dihalobenzene, a sulfur source, and a dihaloaromatic sulfone, have encountered difficulties because suitable polymerization conditions for the respective monomers are sufficiently different to cause poor results to be obtained in the attempted copolymerization of mixtures of dihalobenzenes and dihaloaromatic sulfones.

It would therefore be a contribution to the art if a process for producing random copolymers of poly(arylene sulfide) and poly(arylene sulfide sulfone) from their prospective monomers could be developed.

SUMMARY OF THE INVENTION

An object of the present invention is to provide a composition randomly composed of at least one arylene sulfide segment and at least one arylene sulfide sulfone segment. Another object of the invention is to provide a process for producing a random copolymer composed of at least one arylene sulfide segment and at least one arylene sulfide sulfone segment. Other objects, advantages, and features will become more apparent as the invention is more fully disclosed hereinbelow.

According to the present invention, a process for producing a random copolymer composed of at least one arylene sulfide segment and at east one arylene sulfide sulfone segment comprises contacting at least one dihaloaromatic sulfide with a mixture comprising at least one sulfur source and at least one dihaloaromatic sulfone in the presence of a polar organic compound under polymerization conditions to synthesize a random copolymer.

DETAILED DESCRIPTION OF THE INVENTION

The term "random copolymer" used in the invention refers to, unless otherwise indicated, high molecular weight organic compounds whose structures are represented by a non-predictable sequence of at least two repeating units. The random copolymer of the present invention is preferably a linear random copolymer that comprises at least one arylene sulfide segment and at least one arylene sulfide sulfone segment. The most preferred random copolymer of the present invention is a linear random copolymer consisting essentially of at least one phenylene sulfide segment and at least one phenylene sulfide sulfone segment.

The random copolymer of the invention is prepared by contacting at least one dihaloaromatic sulfide having the formula of $X—Ar(R)_n—S—Ar^1(R^1)_n—X^1$, with a mixture comprising at least one sulfur source and at least one dihaloaromatic sulfone having the formula of $X^2—Ar^2(R^2)_n—S(O_2)—Ar^3(R^3)_n—X^3$ in the presence of a polar compound under polymerization conditions to synthesize the random copolymer; where $X$, $X^1$, $X^2$, and $X^3$ can be the same or different halogen selected from the group consisting of fluorine, chlorine, bromine and iodine; $Ar$, $Ar^1$, $Ar^2$, and $Ar^3$ can be the same or different and are each an arylene group; $R$, $R^1$, $R^2$, and $R^3$ can be the same or different and are each selected from the group consisting of hydrogen and hydrocarbyl radical in which the hydrocarbyl radical can be alkyl, cycloalkyl, alkenyl, and aryl radicals; the $X$, $X^1$, $X^2$, or $X^3$ and $S$ or $S(O_2)$ are in the ortho- or para-positions, preferably in the para-positions; and each n can be the same or different and is a whole number from 0 to 4. The total number of carbon atoms in each molecule represented by $X—Ar(R)_n—S—Ar^1(R^1)_n—X^1$ and $X^2—Ar^2(R^2)_n—S(O_2)—Ar^3(R^3)_n—X^3$ is in the range of from about 12 to about 54, preferably from about 12 to about 36 because of ready availability.

The suitable dihaloaromatic sulfides include, but are not limited to, bis(4-chlorophenyl) sulfide, bis(4-bromophenyl) sulfide, bis(4-iodophenyl) sulfide, bis(2-methyl-4-bromophenyl) sulfide, 2-chlorophenyl 4-bromophenyl sulfide, 4-chlorophenyl 4-bromophenyl sulfide, 4-iodophenyl 3-methyl-4-fluorophenyl sulfide, bis(2-methyl-4-chlorophenyl) sulfide, bis(2-chlorophenyl) sulfide, bis(2,6-dimethyl-4-chlorophenyl) sulfide, bis(2-iodophenyl) sulfide, bis(2,5-diethyl-4-bromophenyl) sulfide, bis(2-bromophenyl) sulfide, bis(3,5-dimethyl-4-chlorophenyl) sulfide, 2-bromophenyl 4-bromophenyl sulfide, bis(2,5-dipropyl-4-chlorophenyl) sulfide bis(3-isopropyl-4-iodophenyl) sulfide, bis(2-butyl-4-fluorophenyl) sulfide, bis(2,3,5,6-tetramethyl-4-chlorophenyl) sulfide, 2-isobutyl-4-chlorophenyl 3-butyl-4-bromophenyl sulfide, 1,4-bis(4-chlorophenylthio)benzene, 2,6-bis(4-bromophenylthio)naphthalene, 7-ethyl-1,5-bis(4-iodophenylthio)naphthalene, bis(4-(4-bromophenylthio)phenyl) ether, 4,4'-bis(4-chlorophenylthio)biphenyl, bis(4-(4-chlorophenylthio)phenyl) sulfide, bis(4-(4-chlorophenylthio)phenyl) sulfone, bis(4-(4-chlorophenylthio)phenyl) ketone, bis(4-(4- bromophenylthio)phenyl)methane, 5,5-bis(3-ethyl-4-(4-chlorophenylthio)phenyl)nonane, and mixtures of two or more thereof. The presently most preferred dihaloaromatic sulfide is bis(4-bromophenyl) sulfide.

The sulfur source suitable for the present invention is selected from the group consisting of alkali metal sulfides, alkali metal hydrosulfides, thiosulfates, thioureas, thioamides, and mixtures of any two or more thereof. Examples of the presently preferred sulfur source include, but are not limited to, sodium sulfide, sodium hydrosulfide, potassium sulfide, potassium hydrosulfide, lithium thiosulfate, sodium thiosulfate, potassium thiosulfate, rubidium thiosulfate, 1-methyl-2-thiourea, 1,3-diisopropyl-2-thiourea, 1-p-tolyl-2-thiourea, thioacetamide, 2-thio-N-methylpyrrolidone, and mixtures of any two or more thereof.

Examples of dihaloaromatic sulfone useful in the present invention include, but are not limited to, bis(4-chlorophenyl) sulfone, bis(4-bromophenyl) sulfone, bis(4-iodophenyl) sulfone, bis(2-methyl-4-bromophenyl) sulfone, 2-chlorophenyl 4-bromophenyl sulfone, 4-chlorophenyl 4-bromophenyl sulfone, 4-iodophenyl 3-methyl-4-fluorophenyl sulfone, bis(2-methyl-4-chlorophenyl) sulfone, bis(2-chlorophenyl) sulfone, bis(2,5-diethyl-4-bromophenyl) sulfone, bis(2-bromophenyl) sulfone, bis(2,5-dipropyl-4-chlorophenyl) sulfone, bis(2-iodophenyl) sulfone, bis(3-isopropyl-4-iodophenyl) sulfone, bis(2-butyl-4-fluorophenyl) sulfone, bis(2,3,5,6-tetramethyl-4-chlorophenyl) sulfone, 2-isobutyl-4-chlorophenyl 3-butyl-4-bromophenyl sulfone, 1,4-bis(4-chlorophenylsulfonyl)benzene, 2,6-bis(4-bromophenylsulfonyl)naphthalene, 7-ethyl-1,5-bis(4-iodophenylsulfonyl)naphthalene, bis(4-(4-bromophenylsulfonyl)phenyl) ether, 4,4'-bis(4-chlorophenylsulfonyl)biphenyl, bis(4-(4-chlorophenylsulfonyl)phenyl) sulfide, bis(4-(4-chlorophenylsulfonyl)phenyl) sulfone, bis(4-(4-chlorophenylsulfonyl)phenyl) ketone, bis(4-(4-bromophenylsulfonyl)phenyl)methane, 5,5-bis(3-ethyl-4-(4-chlorophenylsulfonyl)phenyl.)nonane, and mixtures of two or more thereof. The presently preferred dihaloaromatic sulfone is bis(4-chlorophenyl) sulfone.

Generally, the polar organic compound will substantially dissolve, under polymerization conditions, the dihaloaromatic sulfide, the sulfur source and the dihaloaromatic sulfone, and other compounds which can be present in the polymerization process as will be disclosed hereinbelow. Representative examples of suitable classes of the polar organic compounds include amides, lactams, sulfones, and mixtures thereof. Specific examples of such compounds are hexamethylphosphoramide, tetramethylurea, N,N'-ethylene dipyrrolidone, N-methyl-2-pyrrolidone, pyrrolidone, caprolactam, diphenyl sulfone, N-ethylcaprolactam, sulfolane, dimethylacetamide, low molecular weight polyamides and mixtures thereof. The presently preferred polar organic compound is N-methyl-2-pyrrolidone.

A basic compound may be present in the polymerization reaction of the present invention. The basic compound used in the invention can be an organic base or an inorganic base and can be in either aqueous form or non-aqueous form. The presently preferred basic compound is an inorganic base. Examples of basic compounds include, but are not limited to, sodium hydroxide, potassium hydroxide, lithium hydroxide, sodium carbonate, lithium carbonate, potassium carbonate, calcium hydroxide, calcium carbonate, and mixtures thereof. The presently most preferred basic compounds are sodium hydroxide and sodium carbonate because of their availability and ease of use.

The process of the present invention can also be carried out by contacting an alkali metal carboxylate with the reactants described above to modify the molecular weight of the resulting copolymers. The alkali metal carboxylate bas the formula of $R'CO_2M$ Where M is an alkali metal and R' is a hydrocarbyl radical selected from the group consisting of alkyl, cycloalkyl, aryl, alkenyl, and mixtures of any two or more thereof. Preferably R' is an alkyl radical having 1 to about 6 carbon atoms or a phenyl radical and M is lithium or sodium. If desired, the alkali metal carboxylate can be employed as a hydrate or as a solution or dispersion in water.

Examples of some alkali metal carboxylates which can be employed in the process of this invention include, but are not limited to, lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenyl-cyclohexanecarboxylate, potassium p-tolylacetate, lithium 4-ethylcyclohexylacetate, and mixtures of any two or more thereof.

According to the present invention, the contacting of the above described reactants can take place in the presence of water. Water can also be formed from the interaction of certain sulfur sources and alkali metal hydroxides, if employed. Water can be also added to the reactants at a late stage during polymerization.

According to the present invention, at least one dihaloaromatic sulfide, a sulfur source, at least one dihaloaromatic sulfone, a polar organic compound, and optionally compounds selected from the group consisting of a base, an alkali metal carboxylate, a water source and mixtures thereof, are contacted in a suitable reactor to form a polymerization mixture. The choice of a suitable reactor is a matter of preference to one skilled in the art. The polymerization mixture then can be subjected to suitable polymerization conditions. Suitable polymerization conditions can vary widely and generally include a temperature in the range of from about 100° C. to about 400° C., preferably about 150° C. to about 350° C., most preferably from 180° C. to 280° C., and a time of from about 5 minutes to about 80 hours, preferably from about 10 minutes to about 70 hours, most preferably from 1 hour to 30 hours. The pressure employed is not critical, although it is preferred that the pressure be sufficient to maintain the polymerization reactants substantially in the liquid phase.

The molar ratio of reactants can vary considerably. However, the molar ratio of the sum of dihaloaromatic sulfide and dihaloaromatic sulfone to the sulfur source is preferably from about 0.95:1 to about 1.20:1, most preferably from 0.99:1 to 1.05:1 for best results. The molar ratio of dihaloaromatic sulfide to dihaloaromatic sulfone is preferably in the range of from about 0.01:1 to about 1:0.01, most preferably from 0.05:1 to 1:0.05 for best results, depending on the desired mole percent of poly(arylene sulfide) segment of the random copolymer of the invention.

If an alkali metal hydroxide is employed with a suitable sulfur source, the amount of alkali metal hydroxide to the sulfur source will vary according to the sulfur source but generally will be from about 0.001 to about 5 and preferably 0.001 to 4 gram-mole equivalents per gram atom of sulfur in the sulfur source.

If at least one alkali metal carboxylate is employed according to the invention, the molar ratio of alkali metal carboxylate to the sulfur source is generally about 0.001:1 to about 1.5:1 and preferably about 0.01:1 to about 1:1.

The amount of polar organic compound employed according to the invention can be expressed in terms of a molar ratio of polar organic compound to the sulfur source. Generally, this ratio is about 2:1 to about 25:1 and preferably about 2:1 to about 15:1.

The process of the present invention can be conducted by various methods including batch and continuous processes. One method is to admix the reactants described in a suitable reactor under the conditions described above.

The random copolymer produced according to the present invention can be separated from the final polymerization reaction mixtures by conventional procedures, for example by filtration of the polymerization reaction mixture to separate the random copolymer therefrom, followed by washing with water. Alternatively, the heated polymerization reaction mixture can be diluted with water or additional polar organic compound or a mixture thereof followed by cooling and filtration and water washing of the random copolymer. Preferably, at least a portion of the washing with water is conducted at an elevated temperature, e.g. within the range of from about 30° C. to about 100° C., preferably from 50° C. to 95° C. for easy operation, i.e. without steam.

The random copolymers composed of at least one phenylene sulfide segment and at least one arylene sulfide sulfone segment produced by the process of the invention can be blended with fillers, pigments, extenders, other polymers, and the like. They can be cured through crosslinking and/or chain extension by heating at temperatures up to about 450° C. in the presence of an oxygen-containing gas, to provide cured products having high thermal stability and good chemical resistance. They are useful in the production of coatings, film, molded objects, and fibers.

The following examples are provided in an effort to assist one skilled in the art to further understand the present invention.

EXAMPLE I

In this example, polymerizations were performed in one-liter stainless-steel autoclaves manufactured by Autoclave Engineers, Inc. An anchor type stirrer was utilized for agitation. Full details concerning compositions, yields, and other experiment details are found in Table I. The initial materials were charged to the reactor, and the reactor was sealed and purged four times with nitrogen. The final three purges were performed with the agitator rate set at the rate utilized during polymerization. The autoclave was heated with an electrical heating mantle, and the temperature raised to the desired temperature over a one and a half hour period. After a bold of three hours, the heating was stopped and the heating mantle was removed to allow the reactor to slowly cool to about 25° C.

The polymer wag recovered from the reactor and passed through a series of screens. All material passing through a 100 mesh (0.149 mm) screen was collected and labelled as fines. The remaining material was collected off the various screens and combined as the granular material. Both were then identically treated. They were washed with hot (about 800° C.) deionized water, hot (80° C.) 3% (by weight) acetic acid, acetone, and again with hot deionized water. The products were then dried in a vacuum oven for at least 12 hours under a vacuum of at least 18 torr at 120° C.

The inherent viscosity (hereafter referred to as I.V.) of the polymer was measured with a viscosity apparatus comprised of a stirred water bath controlled at 30° C. and equipped with holders for viscometers. The concentration of the polymer solution in N-methyl-2-pyrrolidone (NMP) was 0.5% (0.25 grams diluted to 50 mL) prepared by weighing polymer samples to the nearest 0.1 mg into a volumetric flask. Following the addition of solvent (NMP), the flask was placed on a stirring hot plate and heated to 100–150° C. to dissolve the polymer. The flask was then transferred to a water bath to bring the temperature of the polymer solution to 30° C. The flask was then filled to the mark with additional solvent. Another flask containing the solvent was also placed in the water bath. A pipette was used to transfer 10 ml of the solvent into the viscometer, and a five minute hold period was used to allow for temperature equilibration. The miniscus of the solvent was raised in the viscometer to the upper mark, a timer was activated to determine the flow time for the solvent to drain through a capillary to a lower mark. This step was repeated to get two flow times within 0.4 seconds (solvent time). A 10 mL sample was then taken from the solution flask and a solution time was determined the same way as a solvent time. The calculation used for I.V. is $\Gamma = \ln(t/t_o)/c$, where t is flow time through a viscometer of a dilute solution of polymer, $t_o$ is flow time through a viscometer of the reference solvent, and c is concentration of a polymer solution in g/100 mL of solvent.

Differential scanning calorimetry (hereinafter referred to as DSC) data for the polymers, including glass transition temperature (Tg), were determined by rapidly quenching (with liquid nitrogen) a melted polymer sample and heating the thus formed substantially amorphous polymer at a rate of 20° C./minute in a differential scanning calorimeter.

TABLE I

| | Preparation of PPS/PPSS Random Copolymers | | | | | |
|---|---|---|---|---|---|---|
| Run # | 1 | 2 | 3 | 4 | 5 | 6 |
| Mass NaSH pure, g | 14.01 | 13.59 | 13.73 | 13.87 | 14.01 | 14.16 |
| Moles NaSH | 0.25 | 0.24 | 0.25 | 0.25 | 0.25 | 0.25 |
| Mass NaOAc, g | 20.51 | 20.51 | 20.51 | 20.51 | 20.51 | 20.51 |
| Moles NaOAc | 0.25 | 0.25 | 0.25 | 0.25 | 0.25 | 0.25 |
| Mass $Na_2CO_3$, g | 53.00 | 53.00 | 53.00 | 43.00 | 53.00 | 53.00 |
| Moles $Na_2CO_3$ | 0.50 | 0.50 | 0.50 | 0.50 | 0.50 | 0.50 |
| Total Moles $H_2O$ | 2.35 | 2.35 | 2.35 | 2.35 | 2.35 | 2.35 |
| Mass NMP, g | 198.27 | 198.27 | 198.27 | 198.27 | 198.27 | 198.27 |

TABLE I-continued

Preparation of PPS/PPSS Random Copolymers

| Run # | 1 | 2 | 3 | 4 | 5 | 6 |
|---|---|---|---|---|---|---|
| Moles NMP | 2.00 | 2.00 | 2.00 | 2.00 | 2.00 | 2.00 |
| BCPS[a] Used, g | 68.20 | 64.61 | 64.61 | 64.61 | 64.61 | 64.61 |
| Moles BCPS | 0.24 | 0.23 | 0.23 | 0.23 | 0.23 | 0.23 |
| DBPS[b] Used, g | 4.30 | 8.60 | 8.60 | 8.60 | 8.60 | 8.60 |
| Moles DBPS | 0.013 | 0.025 | 0.025 | 0.025 | 0.025 | 0.025 |
| Moles Monomer[c] Used | 0.25 | 0.25 | 0.25 | 0.25 | 0.25 | 0.25 |
| Mole % Excess Monomers | 0.0 | 3.1 | 2.0 | 1.0 | 0.0 | −1.0 |
| Rxn. Temp. °C. | 200 | 200 | 200 | 200 | 200 | 200 |
| Rxn. time, Hrs. | 3 | 3 | 3 | 3 | 3 | 3 |
| Stir Rate, rpm | 400 | 400 | 400 | 400 | 400 | 400 |
| Product Form | Particles & Fines | Particles & Fines | Particles & Fines | Particles & Fines | Particles & Fines | Particles & Fines |
| Mass of Granules, g | 49.30 | 49.05 | 46.43 | 49.25 | 46.15 | 42.14 |
| Mass of Fines, g | 6.06 | 6.16 | 8.00 | 5.35 | 7.14 | — |
| Total Mass Recovered, g | 55.36 | 55.21 | 54.43 | 54.60 | 53.28 | 42.14 |
| Theoretical yield | 61.8 | 59.44 | 60.05 | 60.67 | 61.28 | 61.28 |
| % Yield | 89.8% | 92.8% | 90.6% | 9.0% | 87.0% | 68.8% |
| I.V. of Granules (NMP) | 0.25 | 0.20 | 0.20 | 0.19 | 0.21 | 0.23 |
| I.V. of Fines (NMP) | 0.19 | 0.12 | 0.13 | 0.12 | 0.13 | — |
| PPS/PPSS Ratio[d] | 10/90 | 18/82 | 18/82 | 18/82 | 18/82 | 18/82 |
| Tg for Granules (°C.) | 213 | 202 | 201 | 199 | 200 | 199 |
| Tg for Fines (°C.) | 208 | 84 | 197 | 197 | 185 | — |

[a]BCPS, bis(4-chlorophenyl) sulfone.
[b]DBPS, bis(4-bromophenyl) sulfide.
[c]Moles monomer is the sum of moles of BCPS and DBPS.
[d]In using DBPS and BCPS monomers, the repeating units could be represented as $(ArSArS)_m(ArSO_2ArS)_n$, so that every mole of DBPS polymerized translated to two repeating units of PPS being formed. Therefore, a polymerization of equi-molar amounts of BCPS and DBPS resulted in the formation of a copolymer that would be a 67/33 PPS/PPSS copolymer.

The results in Table I show that the random copolymers of PPS and PPSS are amorphous with overall modest molecular weight as determined by I.V. Two different physical forms, a granular material (particles) (90 to 95%) and a finely divided material (fines) (5 to 10%) were produced by the process of the invention. Analyses by DSC and I.V. demonstrated that the fines were merely lower molecular weight versions of their particle counterparts.

EXAMPLE II

This example illustrates that changing the molecular weight modifier to other types of alkali metal carboxylates bas little effect on the molecular weight of a PPS/PPSS random copolymer.

The runs were carried out the same as those of Example I with the exception that different alkali metal carboxylates, as shown in Table II, were used. The results are shown in Table II and demonstrate that the molecular weight, determined by I.V., of a PPS/PPSS random copolymer prepared with lithium acetate (run 9) or lithium benzoate (run 8) is comparable with run 7, which employed sodium acetate.

TABLE II

PPS/PPSS Random Copolymers Prepared Using Different Carboxylates

| Run # | 6 | 7 | 8 | 9 |
|---|---|---|---|---|
| Mass NaSH Pure, g | 14.01 | 14.01 | 14.01 | 14.01 |
| Moles NaSH | 0.25 | 0.25 | 0.25 | 0.25 |
| Mass NaOAc, g | 20.51 | 20.51 | 32.01[d] | 25.05[e] |
| Moles NaOAc | 0.25 | 0.25 | 0.25 | 0.25 |
| Mass NaOH, g | 0.00 | 10.00 | 0.00 | 10.00 |
| Moles NaOH | 0.00 | 0.25 | 0.00 | 0.25 |
| Mass Na₂CO₃, g | 53.00 | 0.00 | 36.95[f] | 0.00 |
| Moles Na₂CO₃ | 0.50 | 0.00 | 0.50 | 0.00 |
| Mass H₂O Added, g | 30.46 | 28.20 | 30.46 | 19.18 |
| Total Moles H₂O | 2.35 | 2.35 | 2.35 | 2.35 |
| Mass NMP, g | 198.27 | 198.27 | 198.27 | 198.27 |
| Moles NMP | 2.00 | 2.00 | 2.00 | 2.00 |
| BCPS Used, g | 64.61 | 64.61 | 64.61 | 64.61 |
| Moles BCPS | 0.23 | 0.23 | 0.23 | 0.23 |
| DBPS Used, g | 8.60 | 8.60 | 8.60 | 8.60 |
| Moles DBPS | 0.03 | 0.03 | 0.03 | 0.03 |
| Moles Monomer Used | 0.25 | 0.25 | 0.25 | 0.25 |
| Moles % Excess Monomers | 0.0 | 0.0 | 0.0 | 0.0 |
| Rxn. Temp., °C. | 200 | 200 | 200 | 200 |
| Rxn. Time, hrs. | 3 | 3 | 3 | 3 |
| Stir Rate, rpm | 400 | 400 | 400 | 400 |
| Product Form | Particles & Fines | Particles & Fines | Particles | Particles & Fines |
| Mass of Granules, g | 46.15 | 38.96 | 47.54 | 49.48 |
| Mass of Fines, g | 7.14 | 5.56 | — | 4.59 |
| Total Mass Recovered, g | 53.28 | 44.52 | 47.54 | 53.07 |
| Theoretical Yield | 61.28 | 61.28 | 61.28 | 61.28 |
| % Yield | 87.0% | 72.7% | 77.6% | 88.2% |
| I.V. of Granules (NMP) | 0.21 | 0.19 | 0.16 | 0.17 |
| I.V. of Fines (NMP) | 0.13 | 0.14 | — | 0.12 |
| Tg of Granules (°C.) | 200 | 195 | — | 196 |

[a]BCPS, bis(4-chlorophenyl) sulfone.
[b]DBPS, bis(4-bromophenyl) sulfide.
[c]Moles monomer is the sum of moles of BCPS and DBPS.
[d]Lithium benzoate, instead of sodium acetate, was used in run 8.
[e]Lithium acetate dihydrate, instead of sodium acetate, was used in run 9.
[f]Lithium carbonate, instead of sodium carbonate, was used in run 8.

EXAMPLE III

This example further illustrates that PPS/PPSS random copolymers having different mole ratios of PPS/PPSS can also be prepared by the process of the invention.

The runs were carried out in the same manner as those described in Example I except as noted in Table III. The results shown in Table III indicate that the 33/67 (run 15) and 50/50 (run 14) PPS/PPSS copolymers were amorphous materials with typical I.V.'s of 0.18–0.19 dL/g. Similarly, despite a large amount of PPS present, both the 67/33 (runs 18–19) and 75/25 (run 11) copolymers were amorphous. However, at the same time there was a positive influence on molecular weight with increasing reaction temperature and decreasing water content of the mixture as opposed to compositions of smaller ratios. This behavior was consistent with more PPS being present in the material.

The 85/15 PPS/PPSS random copolymer (run 10) was a crystalline material that was insoluble in NMP at ambient temperature and had a melting point of 243° C. and a Tg of 96° C.

TABLE III

| | PPS/PPSS With Different Mole Ratios | | | | | |
|---|---|---|---|---|---|---|
| Run # | 10 | 11 | 12 | 13 | 14 | 15 |
| Mass NaSH pure, g | 14.01 | 14.01 | 13.88 | 14.01 | 14.01 | 14.01 |
| Moles NaSH | 0.25 | 0.25 | 0.25 | 0.25 | 0.25 | 0.25 |
| Mass NaOAc, g | 25.51 | 25.51 | 20.51 | 20.51 | 20.51 | 20.51 |
| Moles NaOAc | 0.25 | 0.25 | 0.25 | 0.25 | 0.25 | 0.25 |
| Mass NaOH, g | 0.00 | 0.00 | 0.00 | 10.00 | 10.00 | 0.00 |
| Moles NaOH | 0.00 | 0.00 | 0.00 | 0.25 | 0.25 | 0.00 |
| Mass $Na_2CO_3$, g | 26.50 | 26.50 | 52.99 | 0.00 | 0.00 | 52.99 |
| Moles $Na_2CO_3$ | 0.25 | 0.25 | 0.50 | 0.00 | 0.00 | 0.50 |
| Mass $H_2O$ Added, g | 30.46 | 30.46 | 30.54 | 0.00 | 28.18 | 30.46 |
| Total Moles $H_2O$ | 2.353 | 2.35 | 2.35 | 0.79 | 2.35 | 2.35 |
| Mass NMP, g | 198.27 | 198.27 | 198.27 | 198.27 | 198.27 | 198.27 |
| Moles NMP | 2.00 | 2.00 | 2.00 | 2.00 | 2.00 | 2.00 |
| $BCPS^a$ Used, g | 18.73 | 28.72 | 35.90 | 35.90 | 47.86 | 57.43 |
| Moles BCPS | 0.06 | 0.10 | 0.12 | 0.12 | 0.17 | 0.20 |
| $DBPS^b$ Used, g | 63.58 | 51.61 | 43.01 | 43.01 | 28.67 | 17.20 |
| Moles DBPS | 0.18 | 0.15 | 0.13 | 0.12 | 0.08 | 0.05 |
| Moles Monomer$^c$ Used | 0.25 | 0.25 | 0.25 | 0.25 | 0.25 | 0.25 |
| Mole % Excess Monomers | 0.0 | 0.0 | 1.0 | 0.0 | 0.0 | 0.0 |
| Rxn. Temp., °C. | 200 | 200 | 200 | 215 | 200 | 200 |
| Rxn. Time, hrs. | 3 | 3 | 3 | 3 | 3 | 3 |
| Stir Rate, rpm | 400 | 400 | 400 | 400 | 400 | 400 |
| Product Form | Particles | Particles & Fines | Particles & Fines | Particles | Particles & Fines | Particles |
| Mass of Granules, g | 45.62 | 46.96 | 42.51 | 55.20 | 49.19 | 48.70 |
| Mass of Fines, g | — | 4.10 | — | — | — | — |
| Total Mass Recovered, g | 45.62 | 51.06 | 42.51 | 55.20 | 49.19 | 48.70 |
| Theoretical Yield | 56.17 | 57.28 | 57.51 | 58.07 | 59.40 | 60.48 |
| % Yield | 81.2% | 89.1% | 73.9% | 95.1% | 82.8% | 80.5% |
| I.V. of Granules (NMP) | Insoluble | 0.14 | 0.14 | 0.18 | 0.18 | 0.19 |
| PPS/PPSS Ratio | 85/15 | 75/25 | 67/33 | 67/33 | 50/50 | 33/67 |
| Tg for Granules (°C.) | 96 | 126 | 134 | 142 | 163 | 177 |

$a,b,c,d$see corresponding footnotes in Table I.

EXAMPLE IV

This example illustrates that a dihaloaromatic compound which does not contain a sulfur atom described above is not a suitable monomer for preparing a high molecular weight PPS/PPSS random copolymer.

The runs were carried out the same as run 1 of Example I except that p-dichlorobenzene was used in place of bis(4-bromophenyl) sulfide as monomer. The resulting polymer had a depressed molecular weight (I.V.=0.13), depressed Tg (193° C.), depressed yield (75.5%), and undesirable high ash content (0.57%).

In a separate run that was carried out the same as that described for run 14 except that the monomer bis(4-bromophenyl) sulfide was replaced with p-dichlorobenzene, a solid product was not recovered.

The results shown in the above examples clearly demonstrate that the present invention is well adapted to carry out the objectives and attain the ends and advantages mentioned as well as those inherent therein. While modifications may be made by those skilled in the art, such modifications are encompassed within the spirit of the present invention as defined by the specification and the claims.

That which is claimed:

1. A random copolymer composed of at least one arylene sulfide segment and at least one arylene sulfide sulfone segment produced by the process comprising contacting at least one dihaloaromatic sulfide with a mixture that comprises at least one sulfur source and at least one dihaloaromatic sulfone, in the presence of a polar organic compound, under polymerization conditions to synthesize said random copolymer; wherein said dihaloaromatic sulfide has the formula of $X—Ar(R)_n—S—Ar^1(R^1)_n—X^1$, wherein X and $X^1$ are each a halogen selected from the group consisting of fluorine chlorine, bromine and iodine; Ar and $Ar^1$ are each an arylene group; R and $R^1$ are each selected from the group consisting of hydrogen and hydrocarbyl radical wherein said hydrocarbyl radical is selected from the group consisting of alkyl, cycloalkyl, alkenyl, and aryl radicals; each n is a whole number from 0 to 4.

2. A random copolymer according to claim 1 wherein said arylene sulfide is phenylene sulfide.

3. A random copolymer according to claim 1 wherein said arylene sulfide sulfone is phenylene sulfide sulfone.

4. A random copolymer according to claim 1 wherein said dihaloaromatic sulfide is bis(4-bromophenyl) sulfide.

5. A random copolymer according to claim 1 wherein said sulfur source is selected from the group consisting of alkali metal sulfides, alkali metal hydrosulfides, thiosulfates, thioureas, thioamides, and mixtures of any two or more thereof.

6. A random copolymer according to claim 5 wherein said sulfur source is sodium hydrosulfide.

7. A random copolymer according to claim 5 wherein salad sulfur source is sodium sulfide.

8. A random copolymer according to claim 1 wherein said dihaloaromatic sulfone has the formula of $X^2—Ar^2(R^2)_n—S(O_2)—Ar^3(R^3)_n—X^3$, wherein $X^2$ and $X^3$ are each a halogen selected from the group consisting of fluorine, chlorine, bromine and iodine; $Ar^2$ and $Ar^3$ are each an arylene group; $R^2$ and $R^3$ are each selected from the group consisting of hydrogen and hydrocarbyl wherein said hydrocarbyl can be alkyl, cycloalkyl, alkenyl, and aryl radicals; n is a whole number from 0 to 4; and the total number of carbon atoms in each molecule represented by said $X^2$—$Ar^2(R^2)_n$—$S(O_2)$—$Ar^3(R^3)_n$—$X^3$ is in the range of from about 12 to about 54.

9. A random copolymer according to claim 8 wherein said dihaloaromatic sulfone is bis(4-chlorophenyl) sulfone.

10. A random copolymer according to claim 1 wherein said polar organic compound is selected from the, group consisting of amides, lactams, sulfones, and mixtures thereof.

11. A random copolymer according to claim 10 wherein said polar organic compound is N-methyl-2-pyrrolidone.

12. A random copolymer according to claim 1 wherein said mixture further comprises a basic compound.

13. A random copolymer according to claim 12 wherein said basic compound is sodium hydroxide.

14. A random copolymer according to claim 12 wherein said basic compound is sodium carbonate.

15. A random copolymer according to claim 1 wherein said mixture further comprises an alkali metal carboxylate.

16. A random copolymer according to claim 15 wherein said alkali metal carboxylate is sodium acetate.

17. A random copolymer according to claim 15 wherein said alkali metal carboxylate is lithium acetate.

18. A random copolymer according to claim 15 wherein said alkali metal carboxylate is lithium benzoate.

19. A random copolymer according to claim 1 wherein said mixture further comprises water.

20. A random copolymer according to claim 1 wherein said polymerization conditions comprise a temperature in the range of from about 100° C. to about 400° C. and a time of from about 5 minutes to about 80 hours.

21. A random copolymer according to claim 19 wherein said temperature is in the range of from 180° C. to 280° C. and said time is from 1 hour to 30 hours.

22. A random copolymer composed of at least one phenylene sulfide segment and at least one phenylene sulfide sulfone segment produced by the process comprising contacting bis(4-bromophenyl) sulfide with a mixture, which comprises bis(4-chlorophenyl) sulfone, sodium hydrosulfide, sodium hydroxide, sodium acetate, and water, in N-methyl-2-pyrrolidone, at a temperature in the range of from 180° C. to 280° C. for 1 hour to 30 hours.

* * * * *